W. F. FOLMER.
CAMERA FRONT.
APPLICATION FILED NOV. 1, 1912.
1,134,522.
Patented Apr. 6, 1915.
2 SHEETS—SHEET 2.
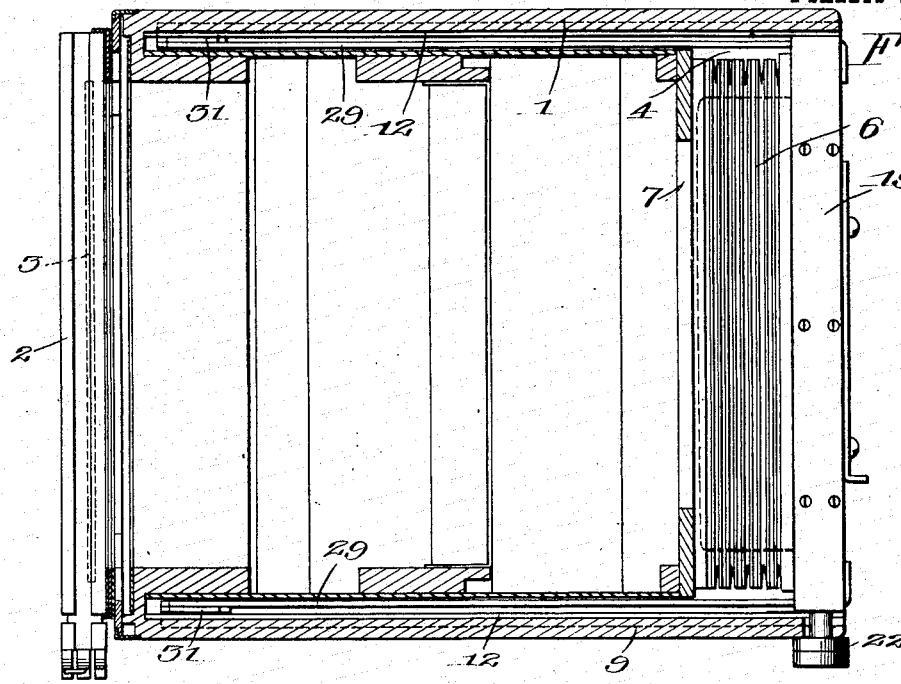
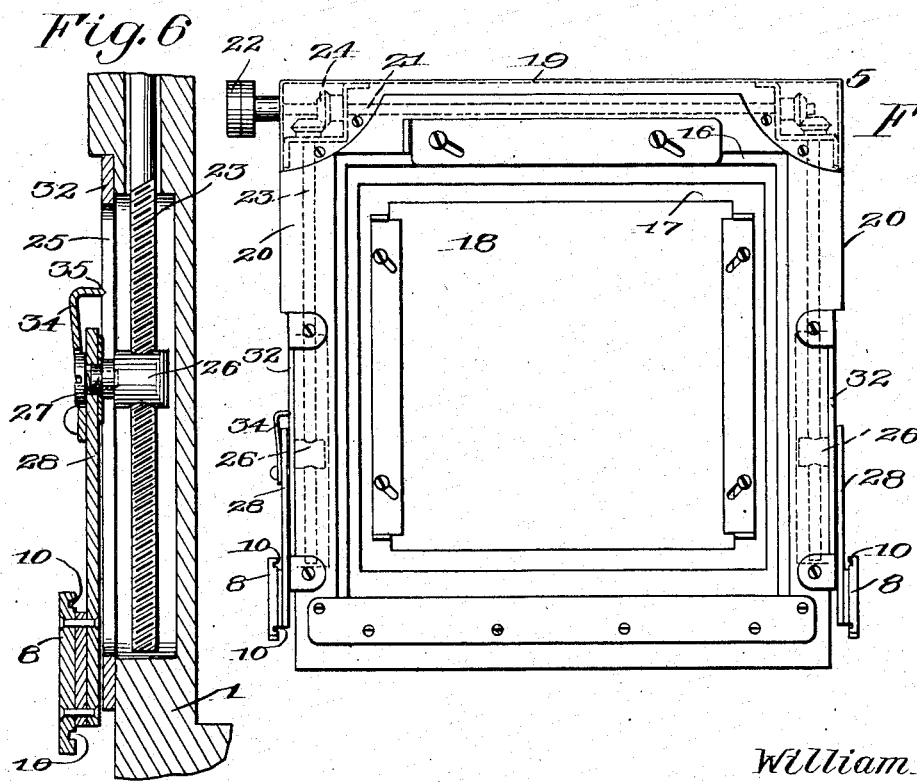
Inventor
William F. Folmer,
By Church & Rich
his Attorneys
Witnesses
Nelson H. Opp

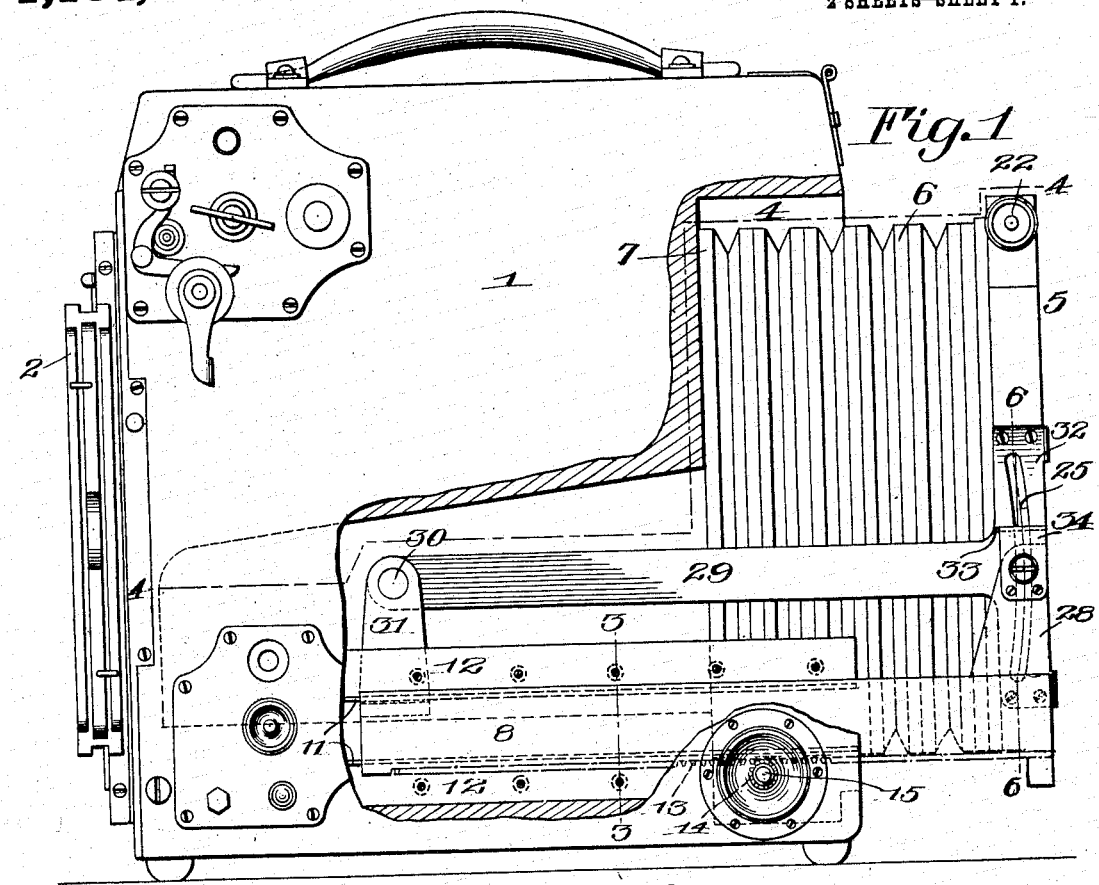

UNITED STATES PATENT OFFICE.

WILLIAM F. FOLMER, OF ROCHESTER, NEW YORK, ASSIGNOR TO EASTMAN KODAK COMPANY, OF ROCHESTER, NEW YORK, A CORPORATION OF NEW YORK.

CAMERA-FRONT.

1,134,522.  Specification of Letters Patent.  Patented Apr. 6, 1915.

Application filed November 1, 1912. Serial No. 729,066.

*To all whom it may concern:*

Be it known that I, WILLIAM F. FOLMER, of Rochester, in the county of Monroe and State of New York, have invented certain new and useful Improvements in Camera-Fronts; and I do hereby declare the following to be a full, clear, and exact description of the same, reference being had to the accompanying drawings, forming a part of this specification, and to the reference-numerals marked thereon.

My present invention relates to photography and more particularly to photographic cameras, and it has for its object to improve the adjusting mechanism for raising or lowering a camera front or lens carrying member.

A further object of the invention is to so regulate the travel of the front during such adjustment that the image reflected by the lens will be cast upon the plate or focal plane of the camera to the best advantage and the bellows will be subjected to no unnecessary distortion.

To these and other ends the invention consists in certain improvements and combinations of parts all as will be hereinafter more fully described, the novel features being pointed out in the claims at the end of the specification.

In the drawings: Figure 1 is a side elevation of a camera constructed in accordance with and illustrating one embodiment of my invention, the side of the box or body being broken away to reveal inner parts and the front being in normal position; Fig. 2 is a similar fragmentary view with the front projected to a greater extent and adjusted to a raised position; Fig. 3 is a detail section taken substantially on the line 3—3 of Fig. 1 showing the guiding arrangements for the extensible support for the front; Fig. 4 is a horizontal section through the camera when closed taken substantially on the line 4—4 of Fig. 1; Fig. 5 is a front elevation of the front and its support detached, and Fig. 6 is a vertical section through the adjusting mechanism of the front taken substantially on the line 6—6 of Fig. 1.

Similar reference numerals throughout the several figures indicate the same parts.

I have illustrated my improvements in the present instance as embodied in a box camera of the reflex type only the general construction of which need be here described. In this view, it comprises a box or body 1 having a suitable holder 2 for the sensitized material at the rear in which holder is shown, in dotted lines at 3 in Fig. 4, a photographic plate that may, for the purposes in hand, be considered to define the focal plane of the camera. At the front is a chamber 4 that receives the front 5 when the camera is folded and also houses the bellows 6 connecting the front and body, the rear end of the bellows being secured at the rear 7 of the chamber 4, but in front of the exposure chamber proper of the camera, a relatively short bellows being employed.

The front 5 is supported in the present instance on a pair of parallel vertically disposed rack bars 8 having their outer sides disposed against the respective side walls of the box 1 and preferably received within channels 9 cut therein, while the opposite or inner sides are provided with parallel grooves 10 that receive inwardly turned flanges 11 on plates 12 secured to the walls and overlapping the bars to constitute tracks upon which the bars slide and between which and the respective adjacent walls of the box they are confined. The lower edges of the bars are provided with gear teeth 13 with which coöperate pinions 14 on a shaft 15 disposed transversely of and journaled in the box or body 1 so that the supports may be projected and retracted and with them the front 5.

The front hitherto referred to generally by reference numeral 5 comprises a frame having seats 16 and 17 therein adapted to receive large or small lens boards in the center of which the lens is carried, but a lens is not illustrated herein, the customary blank board 18 being shown in the seat 17. The upper rail 19 of the said front frame and both of the side rails 20 are hollow, the former to receive a transversely extending drive shaft 21 (shown in dotted lines in Fig. 5) having an exteriorly arranged operating knob 22 and the latter to receive vertically disposed lead screws 23 geared with the shaft 21 at 24 and adapted to be driven thereby. The side rails 20 are further provided with lateral slots 25 into which project nuts 26 swiveled at 27 in standards 28 on the front ends of the respective rack bar supports 8. Thus it will be seen that as the shaft 21 is rotated, the lead screws 23 will raise or lower on the nuts 26 and carry with them the front frame in which the lead screws are journaled. These movements of the front, however, are controlled by a pair of radius arms 29 arranged on opposite sides of the bellows 6 above the supports 8, each of which arms is rigidly connected at its outer or forward end to a side rail 20 of the front, while its inner or rear end is pivoted at 30 to a standard 31 rising from the rear end of the adjacent rack bar 8. The front, therefor, in its rising and falling movements, swings about the rearwardly disposed center 30 and it is for this reason that the slots 25 are made segmental, as shown, and the nuts 26 are swiveled on the standards 28. The slot 25 may be formed in each instance, as shown, in a plate 32 constituting a part of the wall of a side rail 20 and integral with the adjacent radius arm 29, and in order to define the normal position of the front, I prefer to provide a notch 33 in the plate with which coöperates a spring plate 34 having a knife edge 35, the said plate 34 being secured to the standard 28.

The main purpose of this construction is to obtain a mode of operation whereby the lens in its movements of vertical adjustment will swing about a center, the position of which is as near as is practicable to the focal plane and to the center point of the sensitized surface in that plane so that the axial rays of the lens will strike substantially in the center of the plate just as they do when the front is in normal position. In other words, the optical axis of the lens will at all times approximate alinement with the geometrical axis of the sensitized surface and the image as a whole will hence be properly centered thereon. The broad purpose of a rising and falling front is too well known in the art to merit explanation here. It will also be observed that the bellows yields from the same center which is in rear of its rear end during the movements of the front and hence is subjected to greatly reduced distortion.

I claim as my invention:

1. In a camera, the combination with a box or body, a front and an extensible support for the latter relatively to which the front is adapted to be raised and lowered, of a rearwardly extending radius arm connected to the front at one end and having its other end pivoted to a rearward extension of the support.

2. In a camera, the combination with a box or body, a front, a bellows connecting said parts, an extensible support for the front comprising a pair of laterally arranged rack bars between which the front is adapted to be adjusted vertically and driving means on the body coöperating with the rack bars to cause their projection or retraction, of a pair of radius arms connected to the front at their forward ends and having their rearward ends pivoted at rearward points to the respective rack bars so that said arms lie on opposite sides of the bellows.

3. In a camera, the combination with a box or body, a front and a support for the latter relatively to which the front is adapted to be adjusted to raised or lowered positions, of an adjusting means for the front comprising a vertical lead screw on one part and a swiveled nut on the other coöperating therewith, and a rearwardly extending radius arm connected to the front and pivoted to one of said first mentioned parts at a rearward point.

4. In a camera, the combination with a box or body, a front comprising a frame having a hollow side rail provided with a segmental slot and a support for the front relatively to which the latter is adapted to be adjusted to raised or lowered positions, of an adjusting means for the front comprising a swiveled nut on the support projecting through the segmental slot into the hollow side rail of the front and a lead screw arranged in said hollow side rail and coöperating with the nut, and a rearwardly extending radius bar connected rigidly to the front and pivoted at a rearward point to one of said first mentioned parts.

5. In a camera, the combination with a support and a front adjustable vertically thereon and comprising a frame having a hollow side rail provided with a lateral slot, of an adjusting means for the front comprising a lead screw arranged in the hollow rail and a nut on the support projecting through the slot in said rail and coöperating with the lead screw.

6. In a camera, the combination with a support and a front adjustable vertically thereon and comprising a frame having hollow top and side rails, the latter provided with laterally opening slots, of an adjusting means for the front comprising a lead screw arranged in each side rail, a drive shaft arranged in the top rail and geared with the lead screws, said shaft being provided with an exteriorly arranged operating member, and nuts on the support extending through the slots in the side rails into coöperation with the lead screws.

7. In a camera, the combination with a box or body having a wall provided with a guiding recess within the body and a front, of an extensible support for the latter embodying a vertically disposed and relatively flat bar having one side guided in the recess of the wall of the body and provided with longitudinal grooves in the other or outer side and plates on the said wall overlapping the bar and provided with inwardly turned flanges coöperating with the grooves.

WILLIAM F. FOLMER.

Witnesses:
RUSSELL B. GRIFFITH,
H. E. STONEBRAKER.